UNITED STATES PATENT OFFICE.

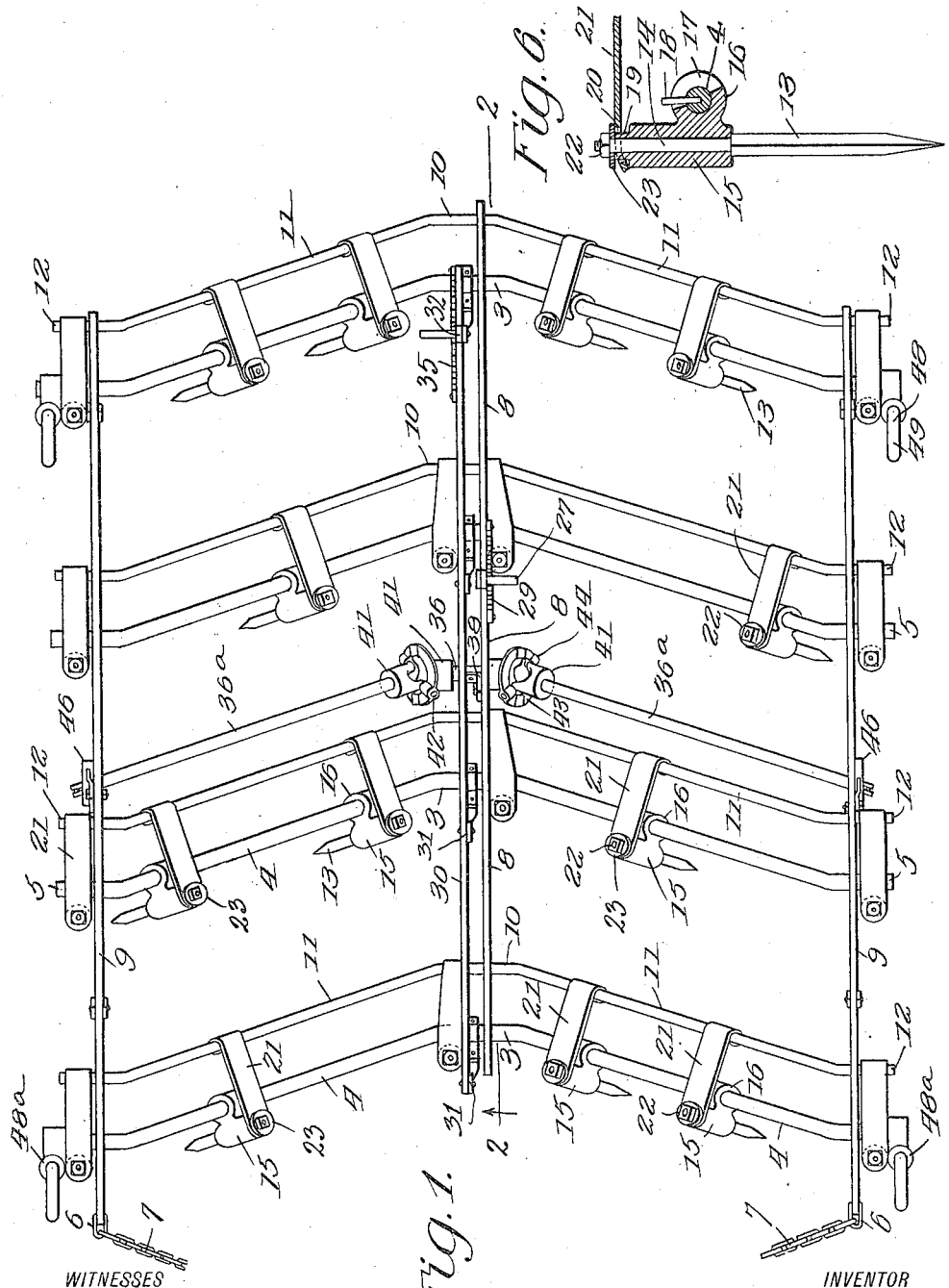

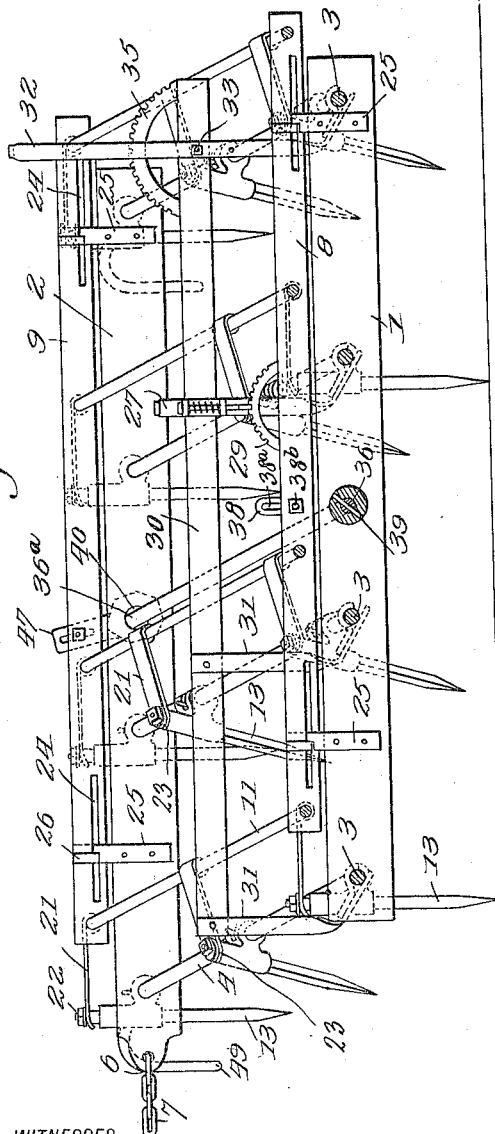

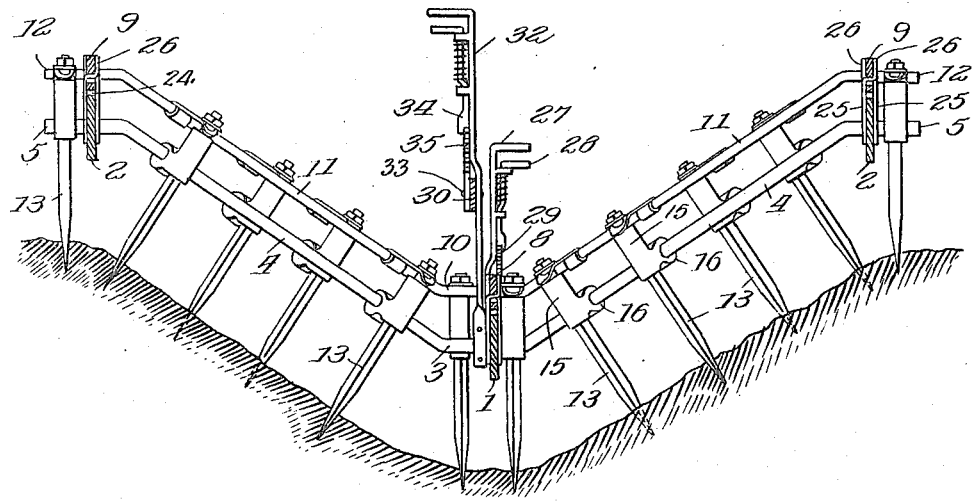

FRANCIS M. VERMILION, OF SHATTUCK, OKLAHOMA.

COMBINATION HARROW AND CULTIVATOR.

1,190,825. Specification of Letters Patent. Patented July 11, 1916.

Application filed June 30, 1915. Serial No. 37,263.

*To all whom it may concern:*

Be it known that I, FRANCIS M. VERMILION, a citizen of the United States, and a resident of Shattuck, in the county of Ellis and State of Oklahoma, have made certain new and useful Improvements in Combination Harrows and Cultivators, of which the following is a specification.

My invention is an improvement in combined harrows and cultivators, and has for its object to provide a device of the character specified, adapted for the simultaneous pulverization and cultivation of the soil, and wherein mechanism is shown arranged so that it may be shaped to fit the character of ground over which it is traveling, that is to move within a furrow with the cultivating mechanism cultivating at the same depth in the bottom of the furrow and on the sides.

In the drawings: Figure 1 is a top plan view of the improved harrow and cultivator, Fig. 2 is a section on the line 2—2 of Fig. 1, Fig. 3 is a side view with the parts in another position, Fig. 4 is a transverse vertical section showing one application of the improvement, Fig. 5 is a front view of the cultivator, Fig. 6 is a section through one of the teeth showing the manner of its connection, Fig. 7 is a section on the line 7—7 of Fig. 3 looking in the direction of the arrows adjacent to the line, and Fig. 8 is a sectional view showing the mounting of the adjusting lever.

The present embodiment of the invention comprises a lower frame consisting of a central and lateral plates 1 and 2 respectively, connected by rods, each consisting of a central portion 3, angular portions 4, extending at obtuse angles to the body, and ends 5 which are approximately parallel to the bodies. The portions 4 of each of the rods or pipes extend forwardly at an obtuse angle to the body and the portions 5 are approximately parallel with the body, the arrangement being such that the portions 5 at the ends of each rod are in advance of the portions 3. Each of the plates 2 is provided at its front end with a link 6, to which may be attached draft apparatus in the form of chains 7. The upper frame consists of a central and lateral bars 8 and 9 respectively, and the bars 8 and 9 are connected by rods similar to the pipes or rods 3—4—5 before mentioned. Each of the pipes or rods of the upper frame comprises a body portion 10, angular portions 11, and ends 12 approximately parallel with the body. In the lower frame the bodies 3 of the rods are journaled in the central plate, and the portions 5 in the lateral plates, while in the upper frame the portions 10 of the rods are journaled in the central plate 8, while the portions 12 are journaled in the lateral plates 9. The teeth 13 are connected to the rods 3—4—5, and 10—11—12, each tooth having its upper end reduced, as indicated at 14, and of circular cross section. The portion 14 of each tooth is passed through a bearing sleeve 15, each sleeve 15 having near its lower end a bearing 16 at right angles to the opening through the sleeve. The bearing 16 is for receiving the portion 4 of the adjacent rod of the lower frame. Each of the bearings 16 is provided with a slot 17, the slot intersecting half of the opening through the bearing, and a pin or key 18 is passed through the slot 17 of each sleeve, and is engaged with an opening in the adjacent rod or bar. The upper end of each of the sleeves 15 is reduced, as shown at 19, to fit within an opening 20 in a plate 21, and a nut 22 is threaded on to the upper end of each tooth above a washer 23 which is seated on the reduced portion above the plate. Each of the plates 21 extends rearwardly from the sleeve 15, and is bent around the portion 11 of the adjacent pipe or rod 10—11—12 of the upper frame. The teeth are thus held in approximately vertical position, the sleeves 15 being of a length to extend from a point below the lower rods 3—4—5, to a point adjacent to the upper rods 10—11—12. Each of the plates or bars 8 and 9 is provided with longitudinally extending slots 24 near its ends, and clips 25 are secured to the adjacent plates 1 and 2, the clips being arranged in pairs on opposite faces of the plates. Each clip has its upper end rabbeted, the members of each pair being rabbeted in opposite directions, to form tongues 26 offset laterally from each other, and the tongues of the members of each pair of clips are passed through the slots 24, and are then bent upwardly to lie alongside the adjacent face of the plate 8 or 9. The plates 8 and 9 are thus slidably held to the plates 1 and 2, and the plates are moved with respect to each other, by means of a lever 27. The lever 27 is pivoted on the portion 1 of the lower frame, and each lever is provided with spring operated latch mechanism 28, coöperating with a toothed sector 29, secured to the plate 8.

As shown in Fig. 8 the lever 27 is pivoted at 27ᵃ to the portion 8 of the upper frame and is connected to the portion 1 of the lower frame by a slidable or lost motion connection. As shown in the said figure the pivotal connection is indicated at 27ᵃ and the pin and the slot or lost motion connection at 27ᵇ.

Another plate 30 is connected to the central plate 1 of the lower frame, by means of braces 31, each brace 31 being pivoted to the plate 30 at its upper end, and being secured to the portion 3 of a pipe or rod of the lower frame. A lever 32 is pivoted to the plate 30 intermediate the ends of the lever, as indicated at 33, and the lower end of the lever is secured to the portion 3 of the rearmost pipe or bar of the lower frame.

The lever is provided with latch mechanism 34 which coöperates with a toothed sector 35 secured to the plate 30, to hold the lever in adjusted position. A stub shaft 36 is arranged in an opening in the central plate 1, and the shaft is connected with the plate 8 by means of an angle bracket 38. One portion of the angle bracket is secured to the plate 8, and the other portion laps upon the stub shaft 36, and a pin 39 is passed transversely of the stub shaft and of the adjacent portion of the bracket, to prevent rotation of the shaft.

The upper end of the angle bracket 38 is longitudinally slotted as indicated at 38ᵃ, and a bolt and nut 38ᵇ connects the bracket with the plate 8. The bolt is passed through the slot 38ᵃ and through the registering opening in the plate 8 and is engaged by the nut. The bolt may slide in the slot under conditions to be presently described. Other shafts 36ᵃ are arranged at the opposite ends of the shaft 36, each shaft 36ᵃ being parallel with the portions 4 and 11 of the bars of the upper and lower frames, and each of the shafts 36ᵃ passes through an opening 40 in the adjacent plate 2 at its outer end. The shafts 36ᵃ are hinged to the ends of the shaft 36, by means of a connection shown in Fig. 1. A head 41 is secured to the inner end of each section 36ᵃ, and each head is provided with outwardly extending alined journal pins or trunnions 42. Similar heads 41 are secured to the ends of the shaft 36, each head having trunnions 42, and bearing rings 43 have radial bearings 44 for receiving the trunnions or journal pins of the adjacent head. At its outer end each of the shafts 36ᵃ is slotted longitudinally, and bearing plates 46 are arranged at the openings 40 of the plates 2. Each bearing plate is provided with a radial extension 47 having a longitudinal slot through which extends a bolt 48 on the adjacent plate 9. Sundry of the sleeves 15, namely those at the corners outside of the plates 9 are provided with extension bearings 48ᵃ, and U-shaped members, each comprising a long arm 49 and a short arm 50 are supported by the extension bearings. The short arm 50 is passed through the extension bearing and is engaged by a nut 51 below the bearing, to hold the member in place.

In operation, the teeth 13 of the harrow may be so arranged with respect to the contour of the ground, as to cut at equal depth regardless of the shape of the ground. With the ordinary harrow in harrowing fields from which a crop of corn has been removed, the teeth cut deep on the ridges, and shallow or not at all in the furrow. Normally when harrowing or cultivating on level ground, the parts occupy the position of Fig. 5, the portions 5 and 12 of the rods or pipes being in advance of the bodies or portions 3 and 10 of the said pipes or bars, and the points of the teeth are at the same level. When it is desired to shape the harrow to the ground, as for instance in Fig. 4, the lever 32 is released from its sector 35, and is swung rearwardly. The braces or struts 31 are rigidly secured to the bodies 3 of the lower pipes or bars, and the lateral plates 2 and 9 will be lifted, together with the portions 5 and 12 of the connecting pipes or bars. The central teeth will be at a lower level than the lateral teeth and the frames may be held in their adjusted position by the latch mechanism in connection with the said lever 32.

The lever 27 is for the purpose of varying the inclination of the teeth 13. When the lever is swung rearwardly, the plates 8 and 9 are moved longitudinally with respect to the plates 1 and 2, and the pipes or bars 10—11—12 are moved laterally with respect to the pipes or bars 3—4—5, as shown in Fig. 3. Since the sleeves 15 are journaled on the rods or bars 3—4—5, and each plate 21 is connected to the adjacent rod bar of the upper frame, it will be evident that the sleeves will be swung, rotating on the rods or bars. The amount of rotation depends upon the extent of movement of the upper frame with respect to the lower frame. The amount of rotation is limited by the key 18, and the said key in addition to limiting the rotation of the sleeves prevents movement of the sleeves longitudinally of the rod or bar.

The outer ends of the shafts 36ᵃ are slotted or recessed, as indicated at 52, and a rod 53 is passed vertically through the bearing plate 46 at the center of the opening 54 of the said plate, and through the slot 52 of the adjacent shaft section. Another pin 55 is passed transversely of the slot outside of the pin or rod 53, for preventing inward movement of the shaft. When the lever 27 is swung in either direction, the plate 8 is moved longitudinally of the plate 1. The angle bracket 38 has a lost motion connection with the plate 8, and as the plate 8 moves as above stated the shaft 36 will be rotated. The connections between the shaft 36 and the shafts 36ª are universal joint connections, and the said shafts 36ª will be rotated with the shaft 36. Since each shaft 36ª is connected as above described, the lateral plates 9 must move with the plates 8. The connections between the outer ends of the shaft sections 36ª and the plates 9 is such as to constrain the plates 9 to move longitudinally when the shaft section 36 is rotated, as above mentioned, or swings the rod 53, which causes the bearing plate 46 to move angularly and the extension 47 moves the plate 9 of the upper frame.

The improved harrow and cultivator as a whole may be considered as upper and lower frames, each frame consisting of a central plate and lateral plates so arranged that the lateral plates are normally advanced with respect to the central plate, and so connected that when the central plate is moved longitudinally with respect to the lateral plates, the lateral plates will be lifted.

The frames are so connected with each other, that they may be moved longitudinally with respect to each other and the teeth are so connected with the two frames that when the frames are moved longitudinally with respect to each other, the inclination of the teeth will be varied.

It will be obvious that any preferred form of teeth might be used in place of those shown, and many changes might be made without departing from the spirit of the invention as set forth in the claims attached hereto.

I claim:

1. A combined harrow and cultivator, comprising upper and lower frames, each frame consisting of a central and lateral plates, the plates of the frames being arranged one above the other and slidably connected for movement longitudinally with respect to each other, a series of rods arranged transversely of each frame and journaled in the plates, each rod having its ends offset laterally with respect to the central portion and in the same direction, and all of the rods being similarly arranged, a series of teeth connected with each adjacent pair of rods of the frames, a sleeve for each tooth, each sleeve having a bearing journaled on the rod of the lower frame, and the tooth having its upper end reduced to pass through the sleeve, a plate for each tooth, each plate having an opening through which the upper end of the tooth extends, and a nut threaded onto the tooth for holding the parts in place, each plate having a bearing at the end remote from the tooth and journaled on the adjacent rod of the upper frame, a lever pivoted intermediate its ends to the central plate of the upper frame and having a lost motion connection at its lower end with the central plate of the lower frame, a quadrant on the said central plate of the upper frame, the lever having latch mechanism for engaging the quadrant for holding the frames in adjusted position, and means in connection with the frames for simultaneously oscillating all of the rods to raise the lateral plates with respect to the central plates, said means comprising a plate arranged longitudinally of the frame at the center thereof, brace arms pivoted at their upper ends to the plate and rigidly connected at their lower ends with sundry of the rods of the lower frame, a lever pivoted to the plate intermediate its ends and having a rigid connection at its lower end with the rearmost rod of the lower frame, latch mechanism for holding the lever in adjusted position, a stub shaft journaled in the central plate of the lower frame, a rigid connection between the stub shaft and the central plate of the upper frame, lateral shafts having a universal joint connection with the ends of the stub shaft and journaled at their outer ends in the lateral plates of the lower frame, and a rigid connection between the outer end of each of the said lateral shafts and the adjacent lateral plate of the upper frame, said lateral shafts being parallel with the inclined portions of the rods.

2. A combined harrow and cultivator, comprising upper and lower frames, each frame consisting of a central and lateral plates, the plates of the frames being arranged one above the other and slidably connected for movement longitudinally with respect to each other, a series of rods arranged transversely of each frame and journaled in the plates, each rod having its ends offset laterally with respect to the central portion and in the same direction, and all of the rods being similarly arranged, a series of teeth connected with each adjacent pair of rods of the frames, a sleeve for each tooth, each sleeve having a bearing journaled on the rod of the lower frame, and the tooth having its upper end reduced to pass through the sleeve, a plate for each tooth, each plate having an opening through which the upper end of the tooth extends, and a nut threaded onto the tooth for holding the parts in place, each plate having a bearing at the end remote from the tooth and journaled on the adjacent rod of the upper frame, a lever pivoted intermediate its ends to the central plate of the upper frame and having a lost motion connection at its lower end with the central plate of the lower frame, a quadrant on the said central plate of the upper frame, the lever having latch mechanism for engaging the quadrant for holding the frames in adjusted position, and means in connection with the frames for simultaneously oscillating all of the rods to raise the lateral plates with respect to the central plates, said means comprising a plate arranged longitudinally of the frame at the center thereof, brace arms pivoted at their upper ends to the plate and rigidly connected at their lower ends with sundry of the rods of the lower frame, a lever pivoted to the plate intermediate its ends and having a rigid connection at its lower end with the rearmost rod of the lower frame, and latch mechanism for holding the lever in adjusted position.

3. A combined harrow and cultivator, comprising upper and lower frames, each frame consisting of a central and lateral plates, the plates of the frames being arranged one above the other and slidably connected for movement longitudinally with respect to each other, a series of rods arranged transversely of each frame and journaled in the plates, each rod having its ends offset laterally with respect to the central portion and in the same direction, and all of the rods being similarly arranged, a series of teeth connected with each adjacent pair of rods of the frames, a sleeve for each toothed, each sleeve having a bearing journaled on the rod of the lower frame, and the tooth having its upper end reduced to pass through the sleeve, a plate for each tooth, each plate having an opening through which the upper end of the tooth extends, and a nut threaded onto the tooth for holding the parts in place, each plate having a bearing at the end remote from the tooth and journaled on the adjacent rod of the upper frame, a lever pivoted intermediate its ends to the central plate of the upper frame and having a lost motion connection at its lower end with the central plate of the lower frame, a quadrant on the said central plate of the upper frame, the lever having latch mechanism for engaging the quadrant for holding the frames in adjusted position, and means in connection with the frames for simultaneously oscillating all of the rods to raise the lateral plates with respect to the central plates.

4. A combined harrow and cultivator, comprising upper and lower frames, each frame consisting of a central and lateral plates, the plates of the frames being arranged one above the other and slidably connected for movement longitudinally with respect to each other, a series of rods arranged transversely of each frame and journaled in the plates, each rod having its ends offset laterally with respect to the central portion and in the same direction, and all of the rods being similarly arranged, a series of teeth connected with each adjacent pair of rods of the frames, a sleeve for each tooth, each sleeve having a bearing journaled on the rod of the lower frame, and the tooth having its upper end reduced to pass through the sleeve, a plate for each tooth, each plate having an opening through which the upper end of the tooth extends, and a nut threaded onto the tooth for holding the parts in place, each plate having a bearing at the end remote from the tooth and journaled on the adjacent rod of the upper frame, a lever pivoted intermediate its ends to the central plate of the upper frame and having a lost motion connection at its lower end with the central plate of the lower frame, and a quadrant on the said central plate of the upper frame, the lever having latch mechanism for engaging the quadrant for holding the frames in adjusted position.

5. A combined harrow and cultivator, comprising upper and lower frames, each frame consisting of a central and lateral plates, the plates of the frames being arranged one above the other and slidably connected for movement longitudinally with respect to each other, a series of rods arranged transversely of each frame and journaled in the plates, each rod having its ends offset laterally with respect to the central portion and in the same direction, and all of the rods being similarly arranged, a series of teeth connected with each adjacent pair of rods of the frames, a sleeve for each tooth, each sleeve having a bearing journaled on the rod of the lower frame, and the tooth having its upper end reduced to pass through the sleeve, a plate for each tooth, each plate having an opening through which the upper end of the tooth extends, and a nut threaded onto the tooth for holding the parts in place, each plate having a bearing at the end remote from the tooth and journaled on the adjacent rod of the upper frame, and means for moving the frames longitudinally with respect to each other.

6. A combined harrow and cultivator, comprising upper and lower frames, a slidable connection between the frames, each frame comprising a central and lateral plates, and rods arranged transversely of the plates and journaled in the plates, each rod being journaled in the central plates at its center and in the lateral plates at its ends, the ends of the rod being offset forwardly with respect to the central portion when the plates of the frames are in register, a series of cultivating means, each of the said means being journaled on a rod of the lower frame, and having a connection with the adjacent rod of the upper frame for swinging the said means on the lower rod when the frames are moved longitudinally, means for moving the upper frame with respect to the lower frame, and means for simultaneously swinging the lateral plates of the upper and lower frames with respect to the central plates.

7. A combined harrow and cultivator, comprising upper and lower frames, a slidable connection between the frames, each frame comprising a central and lateral plates, and rods arranged transversely of the plates and journaled in the plates, each rod being journaled in the central plates at its center and in the lateral plates at its ends, the ends of the rod being offset forwardly with respect to the central portion when the plates of the frames are in register, a series of cultivating means, each of the said means being journaled on a rod of the lower frame, and having a connection with the adjacent rod of the upper frame for swinging the said means on the lower rod when the frames are moved longitudinally, and means for moving the upper frame with respect to the lower frame.

8. A combined harrow and cultivator, comprising upper and lower frames, a slidable connection between the frames for permitting them to move longitudinally with respect to each other, a series of rods journaled transversely of each frame, the ends of each rod being offset laterally in the same direction and the rods being similarly arranged and the rods of the upper frame being adjacent to the rods of the lower frame, teeth supported by the rods and connected to the rods in such manner that when the frames are swung longitudinally with respect to each other the inclination of the rods to the vertical will be simultaneously varied, and means for moving the frames with respect to each other.

FRANCIS M. VERMILION.

Witnesses:
 Nora Lovell,
 Bertha Robinson.

Copies of this patent may be obtained for five cents each, by addressing the "Commissioner of Patents, Washington, D. C."